United States Patent Office 3,146,253
Patented Aug. 25, 1964

3,146,253
NOVEL PHOSPHORUS AND CHLORINE CONTAINING TRICYCLIC HETEROCYCLES
Sheldon B. Greenbaum, Tonawanda, N.Y., and Nicodemus E. Boyer, Chicago, Ill., assignors to Hooker Chemical Corporation, Niagara Falls, N.Y., a corporation of New York
No Drawing. Filed May 15, 1961, Ser. No. 109,880
32 Claims. (Cl. 260—461)

This invention relates to certain novel tricyclic compositions of matter useful as fungicides and organic intermediates and to a process for their preparation.

More specifically, this invention describes the preparation of a new series of phosphorus and chlorine containing tricyclic heterocycles not only possessing fungicidal activity per se but which are suitable as intermediates for preparing compositions of matter useful as pesticides, herbicides, fungicides and lubricants. The scope of the novel compositions of this invention are set forth by the generic formula below:

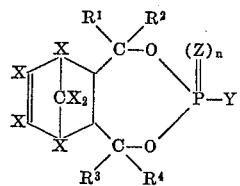

where $n$ is a number chosen from the group 0 and 1, X is halogen, Z is an element selected from the group consisting of oxygen and sulfur, and Y is an organic radical selected from the group consisting of hydrogen, halogen, alkyl, substituted alkyl, aryl, substituted aryl, alkoxy, substituted alkoxy, aryloxy, substituted aryloxy, sulfhydryl, alkylmercapto, substituted alkylmercapto, arylmercapto, substituted arylmercapto and hydroxy, and $R^1$, $R^2$, $R^3$, $R^4$ are organic radicals selected from the group consisting of hydrogen, halogen and lower alkyl. The preferred compositions are those in which $R^1$, $R^2$, $R^3$, and $R^4$ are all hydrogen, and Y is halogen, alkyl, alkoxy, aryloxy, aryl or hydroxy. The formal name of the basic ring structure set forth below:

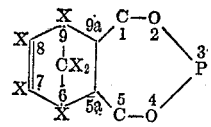

is the 6,7,8,9,10,10-hexahalo-5,5a,6,9,9a-hexahydro-6,9-methano-2,4,3-benzodioxaphosphepin. Compounds within the broad generic scope of this invention are:

| Structure | Name |
|---|---|
| [structure with Cl, CCl₂, CH₂O, PCl, O] | 3,6,7,8,9,10,10-heptachloro-5,5a,6,9,9a-hexahydro-6,9-methano-2,4,3-benzodioxaphosphepin-3-oxide. |
| [structure with Cl, CCl₂, CH₂O, PCl, S] | 3-thiono-3,6,7,8,9,10,10-heptachloro-5,5a,6,9,9a-hexahydro-6,9-methano-2,4,3-benzodioxaphosphepin. |
| [structure with Cl, CCl₂, CH₂O, PSH, S] and salts thereof | 3-thiono-3-thiolo-6,7,8,9,10,10-hexachloro-5,5a,6,9,9a-hexahydro-6,9-methano-2,4,3-benzodioxaphosphepin. |
| [structure with Cl, CCl₂, CH₂O, P—OCH₃, S] | 3-methoxy-3-thiono-6,7,8,9,10,10-hexachloro-5,5a,6,9,9a-hexahydro-6,9-methano-2,4,3-benzodioxaphosphepin. |
| [structure with Cl, CCl₂, CH₂O, P—OC₁₈H₃₇, S] | 3-stearyloxy-3-thiono-6,7,8,9,10,10-hexachloro-5,5a,6,9,9a-hexahydro-6,9-methano-2,4,3-benzodioxaphosphepin. |
| [structure with Cl, CCl₂, CH₂O, P—SC₂H₅, S] | 3-ethylmercapto-3-thiono-6,7,8,9,10,10-hexachloro-5,5a,6,9,9a-hexahydro-6,9-methano-2,4,3-benzodioxaphosphepin. |
| [structure with Cl, CCl₂, CH₂O, P—O—CH₂CH₂Cl, S] | 3-(2-chloroethoxy)-3-thiono-6,7,8,9,10,10-hexachloro-5,5a,6,9,9a-hexahydro-6,9-methano-2,4,3-benzodioxaphosphepin. |

| Structure | Name |
|---|---|
| (structure) | 3-propylmercapto-3-thiono-6,7,8,9,10,10-hexachloro-5,5a,6,9,9a-hexahydro-6,9-methano-2,4,3-benzodioxaphosphepin. |
| (structure) | 3-methyl-3-thiono-6,7,8,9,10,10-hexachloro-5,5a,6,9,9a-hexahydro-6,9-methano-2,4,3-benzodioxaphosphepin. |
| (structure) | 3-methoxymethylmercapto-3-thiono-6,7,8,9,10,10-hexachloro-5,5a,6,9,9a-hexahydro-6,9-methano-2,4,3-benzodioxaphosphepin. |
| (structure) P—OH (or PH tautomer) | 3-hydroxy-6,7,8,9,10,10-hexachloro-5,5a,6,9,9a-hexahydro-6,9-methano-2,4,3-benzodioxaphosphepin. |
| (structure) | 3-phenyl-3 thiono-6,7,8,9,10,10-hexachloro-5,5a,6,9,9a-hexahydro-6,9-methano-2,4,3-benzodioxaphepin. |
| (structure) | 3-phenoxy-6,7,8,9,10,10-hexachloro-5,5a,6,9,9a-hexahydro-6,9,-methano-2,4,3-benzodioxaphosphepin. |
| (structure) | 3-phenoxy-6,7,8,9,10,10-hexachloro-5,5a,6,9,9a-hexahydro-6,9-methano-2,4,3-benzodioxaphosphepin-3-oxide. |
| (structure) | 1,5-dichloro-3-phenyl-6,7,8,9,10,10-octachloro-5,5a,6,9,9a-hexahydro-6,9-methano-2,4,3-benzodioxaphosphepin-3-oxide. |
| (structure) P—OH and salts | 3-hydroxy-6,7,8,9,10,10-hexachloro-5,5a,6,9,9a-hexahydro-6,9-methano-2,4,3-benzodioxaphosphepin-3-oxide. |
| (structure) | 1,5-dimethyl-3-thiono-3,6,7,8,9,10,10-heptachloro-5,5a,6,9,9a-hexahydro-6,9-methano-2,4,3-benzodioxaphosphepin. |
| (structure) | 3,3′-ethylenebis (3-thiono-6,7,8,9,10,10-hexachloro-5,5a,6,9,9a-hexahydro-6,9-methano-2,4,3-benzodioxaphosphepin). |
| (structure) | 3-bromo-3-thiono-6,7,8,9,10,10,3-heptabromo-5,5a,6,9,9a-hexahydro-6,9-methano-2,4,3-benzodioxaphosphepin. |

| Structure | Name |
|---|---|
| (structure) | 3-mercapto-3-thiono-6,7,8,9-tetrachloro-10,10-dibromo-5,5a,6,9,9a-hexahydro-6,9-methano-2,4,3-benzodioxaphosphepin. |
| (structure) | 3,6,7,8,9,10,10-heptachloro-5,5a,6,9,9a-hexahydro-6,9-methano-2,4,3-benzodioxaphosphepin. |
| (structure) | 3-chloromethyl-6,7,8,9,10,10-hexachloro-5,5a,6,9,9a-hexahydro-6,9-methano-2,4,3-benzodioxaphosphepin-3-oxide. |
| (structure) | 3-(4-nitrophenyl)-3-thiono-6,7,8,9,10,10-hexachloro-5,5a,6,9,9a-hexahydro-6,9-methano-2,4,3-benzodioxaphosphepin. |
| (structure) | 3-(4-t-butylphenoxy)-3-thiono-6,7,8,9,10,10-hexachloro-5,5a,6,9,9a-hexahydro-6,9-methano-2,4,3-benzodioxaphosphepin. |
| (structure) | 3-(2,4,5-trichlorophenyl-mercapto)-6,7,8,9,10,10-hexachloro-5,5a,6,9,9a-hexahydro-6,9-methano-2,4,3-benzodioxaphosphepin. |
| (structure) | 3-phenylmercapto-3-thiono-6,7,8,9,10,10-hexachloro-5,5a,6,9,9a-hexahydro-6,9-methano-2,4,3-benzodioxaphosphepin. |

This invention in its composition aspects offers several important advantages not found previously in comparable compositions of the prior art.

Among the advantages possessed by many of the compounds of the invention is their pronounced fungitoxic activity against several of the more common fungus diseases such as the "early blights" which are ruinous to many commercially valuable vegetable plants such as beans and tomatoes. For example, complete control of early blight (*Alternaria solani*) and southern blight (*Sclerotium rolfsii*) in tomato plants infected with this disease is obtained through the use of sprays or admixing the chemicals into the soil. Obviously, the precise rate of application is dependent upon several variables such as the type of plant treated, type of infection, the severity of the infection, climatic conditions as well as the mode of application. However, for the treatment of soil heavily infested with *Sclerotium rolfsii* as little as twenty-five parts of the active compounds per million parts of the admixed soil has been shown to be effective among the more active compounds, although five hundred to three thousand parts of the fungicide may be required with the weaker compounds in the series. Similarly, a spray of 0.2 percent concentration of the fungicide on tomato plants infected with *Alternaria solani* has been found under average conditions to give substantially complete control.

An additional advantage of the fungicidal compositions of this invention is that they are readily compatible with other fungicides for formulating adjuvants or fertilizers. Among the fungicides that the invention compositions may be formulated with are sulfur, chloroquinones and dithiocarbamates. Adjuvants such as detergents, sulfonated vegetable oils, surface active agents, chelating agents and emulsifying materials may be used in conjunction with the inventive compositions. When the compositions of this invention are applied as a foliar spray, water soluble phosphorus, nitrogen, potash and trace metal salts may be incorporated so as to stimulate growth of the infected plant. Similarly, where the inventive compounds form salts, i.e., the 3-mercapto and the 3-hydroxy compounds, the salts may frequently be valuable to impart such valuable characteristics such as solubility, ease of handling and the like.

While the compositions of this invention are valuable as fungicides, they also are useful as intermediates for the preparation of lubricating oils and greases. For example, preliminary development work indicates that the compositions of this invention possess the ability to impart extreme pressure load-bearing properties to hydrocarbon greases and oils. Since these extreme pressure properties seem to be retained throughout a wide range of operating temperatures, the compositions of this invention have utility as lubricant additives in aircraft and automobile motors. It is known that organically-bound chlorine in a certain range of stability and organically-bound phosphorus and/or sulfur in a certain range of stability are both necessary for optimum extreme-pressure lubricant properties. It is though that these elements interact with the metal surfaces to be lubricated, and the rate of interaction is believed to be critical. Consequently, a great deal of effort has been expended in the lubricant industry on such materials as chloroparaffins and phosphorus sulfide-olefin adducts in innumerable blends and modifications. Our new compounds appear to contain chlorine, phosphorus, and in some cases, sulfur in the desired range of stability. While no mechanism for these unusual physical properties is advanced, it may well be that the unique bicyclo seven membered heterocyclic ring imparts these characteristics.

Yet another valuable aspect of these compositions appears to be as intermediates to be used in the preparation of pesticidally, herbicidally, and fungicidally active compounds.

When the novel compositions of matter are formulated as fungicides or pesticides they are usually incorporated into the solvent or solid mixture at a 0.1–10 percent concentration. Acetone or other appropriate aliphatic ketones or alcohols may be used to disperse or dissolve the active composition when they are used as sprays. If it is desired, the pesticidal compositions may be made up as a dust using inert or active carriers. Typical solid inert carriers are powdered clay, silica, diatomaceous earth, sulfur or other narrow or broad spectrum fungicides or pesticides. If liquid carriers or diluents are preferred, the above mentioned aliphatic alcohols or ketones may be used as well as water, the polyoxyethylene ethers.

One advantage of the process aspect of this invention is that it extends the synthetic tools of organic chemistry. For example, the common and expected reaction of a 1,4-diol with a difunctional reactant does not result in ring closure but in polymer formation. It was therefore, both unexpected and unusual to discover that compounds of this invention possessing seven membered rings could be made in good yield by the corresponding reaction of a 1,4-diol with a phosphorus radical having at least two of its chemical bonds joined to a radical of higher electronegativity. The term higher electronegativity is used in the sense that Linus Pauling defines it in his treatise Nature of the Chemical Bond, 2nd edition, published by Cornell University Press (1948), particularly pages 58, 59 and 60.

A specific advantage of the process of this invention is that it enables one to prepare 6,7,8,9,10,10-hexachloro-5,5a,6,9,9a - hexahydro - 6,9 - methano-2,4,3-benzodioxaphosphepin compositions of this invention, said compositions being novel to the art and a potential source of an even greater supply of pesticidally active compounds and oil additives when used as a starting material or intermediate, besides possessing such activity per se.

The inventive process is performed by the steps of admixing a halogenated bicyclic diol of the general formula below,

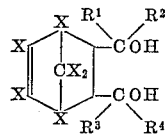

where X is halogen, preferably chlorine or bromine and $R^1$, $R^2$, $R^3$ and $R^4$ are members of the group selected from hydrogen, halogen or lower alkyl, preferably hydrogen (this latter compound herein is referred to as HET Diol), with a phosphorus compound having at least two chemical bonds joined to a radical of higher electronegativity, the term electronegativity being used as previously defined. Typical of the phosphorus compounds intended as reactants are the anhydrides, thioanhydrides and halides of the phosphorus acids including, but not limited to $P_2O_5$, $P_2S_5$, $PCl_3$, $PCl_5$, $P_2O_3$, $POCl_3$, $PSCl_3$, $PBr_3$, $POBr_3$, $CH_3POCl_2$, $CH_3PCl_2$, $C_6H_5POCl_2$, $C_6H_5PCl_2$, $CH_3OPCl_2$, $CH_3OPOCl_2$, $CH_3OPSCl_2$, and the like. It is believed that the ring closure process to yield the benzodioxaphosphepin ring system of this invention is novel to the art and may assume great commercial importance in synthetic organic chemistry, since no truly satisfactory method for making this ring system has been previously available. Because of the great variety of reactants within this invention, it is difficult to make any precise statement of reaction conditions. For example, many of the phosphorus containing reactants (such as the first nine examples in the list above), are highly reactive and will react at low temperatures merely by admixing in a liquid phase induced by either melting or through the use of an organic solvent inert to the phosphorus moiety such as benzene, toluene, hexane and the like. In contrast, however, many of the less reactive phosphorus reactants such as those in which there is an alkyl, aryl, alkoxy or aryloxy radical on the phosphorus atom, do not react at all at low temperatures or react so sluggishly that a certain amount of external heat must be applied to induce reaction and to keep the reaction going. For this reason, one can only say that the general temperature range required for the formation of the inventive compositions is from minus twenty degrees centrigrade to two hundred and fifty degrees centigrade and the time necessary for the substantial completion of the reaction being from several minutes to several days. As previously stated the use of diluents inert to the reactive phosphorus moiety is dependent upon convenience as well as the physical state of the reactants. The reaction is determined to be complete when infra-red analysis of the reaction mixture reveals little or no diol present. In these reactions using phosphorus halides, hydrogen halide is a by-product. Yields and reaction rates are generally improved by having one mole of a base present per mole of hydrogen halide formed. Examples of suitable bases are tertiary amines, alkali metal carbonates and hydroxides.

Where the group Y (see generic formula in column 1), is a group not having carbon atoms bonded directly to the phosphorus atom of the ring, for example, where Y is halogen, it may often be replaced by other groups Y' by reaction of the original compound containing Y with a nucleophilic reagent yielding the anion (Y)⁻. For example, where Y is halogen, it may be replaced by Y'=OH using $H_2O$, NaOH, KOH or the equivalent (OH)⁻ anion source as reagent or where Y is alkoxy by using an alkoxide as reagent.

The preparation of the "HET diol" or substituted "HET Diol" which are one of the reactants of this inventive ring closure process is disclosed in British Patent 772,212, filed in Great Britain, May 13, 1955. The alpha substituted diols are made in an analogous fashion. More detailed but non-limiting descriptions of the operation of this inventive process as well as the identification of the new compositions produced are given in the examples which follow.

*Example I.—Preparation of the Substituted 56,-Bis(Hydroxymethyl) - 1,2,3,4,7,7-Hexachlorobicycloheptene-2 (HET Diol)*

The diols of the present invention are prepared by the reaction of three parts by weight hexachlorocyclopentadiene with one part by weight of cis-2-butene-1,4-diol in about three parts by weight of dioxane, as set forth in Example I of the above-identified British Patent.

The reaction is as follows:

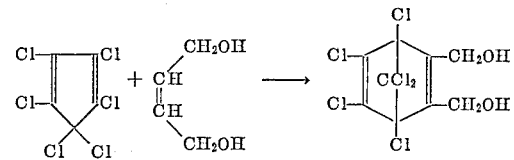

*Example II.—Preparation of 3,6,7,8,9,10,10-Heptachloro-5,5a,6,9,9a - Hexahydro-6,9-Methano-2,4,3-Benzodioxaphosphepin*

To a three hundred and sixty-one part by weight portion of 5,6 - (hydroxymethyl) - 1,2,3,4,7,7 - hexachlorobicycloheptene-2 "HET Diol" prepared as disclosed in Example I, is added dropwise over a forty-five minute period, two hundred and six parts by weight of phosphorus trichloride. The mixture is heated at reflux for three hours. At the end of this time the excess phosphorus trichloride is removed under vacuum by raising the temperature to one hundred and eighty degrees centigrade for fifteen minutes. Crystallization from hexane yields two hundred and two parts by weight of the product, a grayish powder melting at sixty-five to sixty-eight degrees centigrade.

*Analysis.*—Calcd. for $C_9H_6O_2Cl_7P$: P, 7.3. Found P, 7.4.

*Example III.*—*Preparation of 3-Hydroxy-6,7,8,9,10,10-Hexachloro - 5,5a,6,9,9a - Hexahydro - 6,9 - Methano-2,4,3-Benzodioxaphosphepin*

The 3-chloro - 6,7,8,9,10,10 - hexachloro-5,5a,6,9,9a-hexahydro-6,9-methano - 2,4,3 - benzodioxaphosphenpin prepared in Example II is dissolved in acetone and precipitated by the addition of water to give a white powder melting at one hundred and seventy to one hundred and seventy-six degrees centigrade. Infra-red analysis indicated that the 3-chloro group had been replaced by the 3-hydroxy group.

*Analysis.*—Calcd. for $C_9H_6Cl_6O_3P$: P, 7.6; Cl, 52.0 Found: P 7.4; Cl. 50.7.

*Example IV.*—*Preparation of 3 - Ethoxy - 6,7,8,9,10,10-Hexachloro - 5,5a,6,9,9a - Hexahydro - 6,9 - Methano-2,4,3-Benzodioxaphosphepin*

To a solution of 36.1 parts by weight of "HET Diol" and twenty-one parts by weight of triethylamine in one hundred and thirty-two parts by weight of benzene is added dropwise a solution of 13.2 parts by weight of ethyl phosphorodichloridite in forty-four parts by weight of benzene at a temperature of twenty-five to thirty degrees centigrade. After the addition is completed, the mixture is allowed to stand for an additional hour at room temperature. The precipitate of triethylamine hydrochloride is removed and the filtrate containing the desired product reduced to dryness under vacuum. Distillation gives an oil boiling at one hundred and ten degrees at eight millimeters' pressure, which the infra-red spectrum indicates to be the desired 3 - ethoxy - 6,7,8,9,10,10 - hexachloro-5,5a,6,9,9a-hexahydro - 6,9 - methano - 2,4,3 - benzodioxaphosphepin product.

*Example V.*—*Preparation of 3 - Butoxy - 6,7,8,9,10,10-Hexachloro - 5,5a,6,9,9a - Hexahydro - 6,9 - Methano-2,4,3-Benzodioxaphosphepin*

Using the procedure described in Example IV, the product is prepared from 72.2 parts by weight of "HET Diol," forty-four parts by weight of triethylamine in two hundred and sixty-four parts by weight of benzene and a solution of 31.8 parts by weight of butyl phosphorodichloridite in eighty-eight parts by weight of benzene. The 3-butoxy - 6,7,8,9,10,10 - hexachloro - 5,5a,6, 9,9a-hexahydro - 6,9 - methano - 2,4,3 - benzodioxaphosphepin obtained is an oil having a molecular weight of four hundred and fifty (plus or minus five percent), compared to the calculated molecular weight of four hundred and sixty-two. Infra-red authenticates the formation of the desired product and the absence of —OH groups.

*Example VI.*—*Preparation of 3-Butylmercapto-6,7,8,9,10, 10-Hexachloro-5,5a,6,9,9a-Hexahydro - 6,9 - Methano-2,4,3-Benzodioxaphosphepin*

The compound is prepared using the procedure and materials of the preceding example except that 38.2 parts by weight of S-butyl phosphorodichloridothioite is used instead of the analogous butyl compound of Example V The product's infra-red spectrum indicated the desired compound is formed.

*Analysis.*—Calcd. for $C_{13}H_{15}Cl_6O_2PS$: S, 6.7 percent. Found: S, 6.7.

*Example VII.*—*Preparation of 3-Phenylmercapto-6,7,8,9, 10,10-Hexachloro-5,5a,6,9,9a-Hexahydro-6,9-Methano-2,4,3-Benzodioxaphosphepin*

The product is made by the procedure set forth in Example V using 42.2 parts by weight of S-phenyl phosphorodichloridothioite. Infra-red establishes the formation of the named product by the absence of two —OH group absorption bands, and the presence of characteristic aromatic C=C and —C—H bands.

*Example VIII.*—*Preparation of 3 - Phenyl - 6,7,8,9,10,10-Hexachloro - 5,5a,6,9,9a - Hexahydro - 6,9 - Methano-2,4,3-Benzodioxaphosphepin-3-Oxide*

The product is made using the procedure of Example V, and thirty-nine parts by weight of phenylphosphonic dichloride. A white solid melting at one hundred and eighty-four to one hundred and eighty-six degrees centigrade after several recrystallizations from ethanol is obtained. The infra-red spectrum establishes that the desired product is formed.

*Example IX.*—*Preparation of 3-Thiono-3-Phenyl-6,7,8,9, 10,10-Hexachloro-5,5a,6,9,9a-Hexahydro-6,9-Methano-2,4,3-Benzodioxaphosphepin*

The above entitled compound is prepared using the process of Example V and 42.2 parts by weight of phenylphosphonothioic dichloride. Identity is confirmed in infra-red analysis.

*Example X.*—*Preparation of 3-(p-Nitrophenoxy)-6,7,8, 9,10,10 - Hexachloro - 5,5a,6,9,9a - Hexahydro - 6,9, Methano-2,4,3-Benzodioxaphosphepin*

This solid product melting at one hundred and fifty-eight to one hundred and sixty-two degrees centigrade is prepared by the method of Example V using eighty parts by weight of p-nitrophenyl phosphorodichloridite. Identity is confimed by the infra-red analysis.

*Example XI.*—*Preparation of 3-Phenoxy-6,7,8,9,10,10-Hexachloro - 5,5a,6,9,9a - Hexahydro - 6,9 - Methano-2,4,3-Benzodioxaphosphepin-3-Oxide*

This product is prepared by the procedure of Example V, using 42.2 parts by weight of phenyl phosphorodichloridate. The product which melted at one hundred and ninety-seven to two hundred degrees centigrade is demonstrated to be the desired compound by infra-red analysis.

*Analysis.*—Calcd. for $C_{15}H_{11}O_4Cl_6P$: Cl, 42.6 percent; P, 6.2 percent. Found: Cl, 42.6 percent; P, 6.2 percent.

*Example XII.*—*Preparation of 3-Thiono-3-Mercapto-6, 7,8,9,10,10 - Hexachloro - 5,5a,6,9,9a - Hexahydro - 6, 9-Methano-2,4,3-Benzodioxaphosphepin*

A solution of 61.3 parts by weight of "HET Diol" in two hundred and twenty parts by weight of toluene is heated to reflux, then treated with 18.2 parts by weight of phosphorus pentasulfide added gradually. After five hours, the solvent is removed under vacuum leaving a solid mass, which when pulverized and boiled under hexane gives a solid preparation melting at one hundred and twenty to one hundred and thirty degrees centigrade. The identity of the material is established through infra-red analysis and through the preparation of the triethylamine salt in benzene. The salt melted at one hundred and ninety-five to one hundred and ninety-seven degrees centigrade.

*Analysis.*—Calcd. for $C_{15}H_{22}O_2Cl_6NPS_2$: N, 2.5 percent; S, 11.5 percent. Found: N, 2.6 percent; S, 11.5 percent.

*Example XIII.*—*Preparation of 3-Thiono-3-Methoxy-methylmercapto - 6,7,8,9,10,10 - Hexachloro - 5,5a,6, 9,9a - Hexahydro - 6,9 - Methano - 2,4,3 - Benzodioxaphosphepin*

A slurry of 5.6 parts by weight of the triethylamine salt of Example XII in benzene is treated with an equimolar amount of chloromethylether (0.8 part by weight), dissolved in a small amount of benzene. The original precipitate dissolves with the formation of 1.4 parts by weight of triethylamine hydrochloride (theory 1.36 parts by weight). The filtrate is stripped of solvent under vacuum leaving a viscous oil which is shown by infra-red analyses to be the sought product.

*Example XIV.—Chlorination of 3-Phenyl-6,7,8,9,10,10-Hexachloro - 5,5a,6,9,9a -Hexahydro - 6,9 - Methano-2,4,3-Benzodioxaphosphepin-3-Oxide*

A solution of 48.3 parts by weight of 3-phenyl-3-oxide-6,7,8,9,10,10 - hexachloro - 5,5a,6,9,9a - hexahydro - 6,9-methano-2,4,3-benzodioxaphosphepin of Example VIII is chlorinated at sixty to seventy degrees centigrade in the presence of U.V. light. The reaction is complete when 0.2 moles of hydrogen chloride is evolved after a nitrogen purge.

*Example XV.—Preparation of 3-Chloro-3-Thiono-6,7,8,9,10,10-Hexachloro-5,5a,6,9,9a-Hexahydro - 6,9 - Methano-2,4,3-Benzodioxaphosphepin*

To a stirred solution of three hundred and sixty-one parts by weight of HET Diol prepared by the method of Example 1, one hundred and seventy-four parts by weight of pyridine and two hundred and sixty-six parts by weight of methylene chloride is added dropwise one hundred and seventy parts by weight of PSCl₃ at such a rate of addition that the temperature of the reactants remains below twenty degrees centigrade. The reaction solution is allowed to remain, stirring overnight, and slowly come to room temperature. The mixture is then poured into ice and water and is extracted three times with methylene dichloride. The methylene chloride extract is washed twice with dilute HCl, then once with water and dried over magnesium sulfate. After filtering the extract is evaporated to a residue under vacuum. The residue is taken up in methanol and decolorized with activated carbon, the material is filtered and volatile material removed under vacuum to yield the desired product.

*Analysis.*—Calcd. for $C_9H_6Cl_7SP$: Cl, 54.3; S, 7.0. Found: Cl, 54.4; S, 7.4.

Infra-red analysis indicated the presence of the characteristic spectra indicative of the above products structure.

*Example XVI.—3 - Chloromethyl - 6,7,8,9,10,10 - Hexachloro-5,5a,6,9,9a - Hexahydro - 6,9 - Methanol - 2,4,3-Benzodioxaphosphepin-3-Oxide*

A solution of 144.4 parts by weight of HET Diol and 80.8 parts by triethylamine in five hundred and twenty-four parts by weight of dry benzene is treated dropwise with seventy parts by weight of chloromethylphosphonic dichloride in an additional three hundred parts by weight of benzene. The temperature is maintained below thirty degrees during the addition. After five hours, the triethylamine salt is removed and the filtrate reduced to dryness. The crude product is crystallized from butanol then from a benzene hexane mixture to give a material melting at one hundred and fifty-two to one hundred and fifty-four degrees.

*Analysis.*—Calcd. for $C_{10}H_8Cl_1O_3P$: Cl, 54.2 percent. Found: Cl, 54.1 percent.

*Example XVII.—Insecticidal Activity of the Chlorination Product of Example XIV*

Fifty adult houseflies of the Chemical Specialties Manufacturers Association strain are sprayed in a two by five inch diameter stainless steel cage faced on top and bottom with fourteen mesh screen. Flies are retained in the cage in which they are sprayed for knockdown observations and twenty-four hour mortality determinations. The product is dispersed in water to a one percent concentration. The following results are obtained using 0.05 DDT as the positive control standard.

Two hour knockdown_____Ten percent of houseflies.
Twenty-four hour mortality____Fifty percent of houseflies.

*Example XVIII.—Representative Compounds of the Invention Against Alternaria solani*

The following compounds of this invention are made up as 0.2 percent dispersions in water and sprayed onto one-half the tomato plants growing in a small area, the plants being infected with early blight disease (*Alternaria solani*). An examination of the treated plants revealed substantially complete control of the disease while most of the untreated control plants developed severe symptoms of the disease.

| Structure of compound | Example of Preparation |
|---|---|
| (Cl, CCl₂, Cl ring with CH₂O–P(=S)Cl–CH₂O bridge) | Example XV. |
| (Cl, CCl₂, Cl ring with CH₂O–PCl–CH₂O bridge) | Example II. |
| (Cl, CCl₂, Cl ring with CH₂O–POC₄H₉–CH₂O bridge) | Example V. |

*Example XIX.—Activity of Representative Compounds of This Invention Against Sclerotium rolfsii (Southern Blight Disease)*

The below listed compounds of this invention are admixed with soil, heavily infested with spores of southern blight disease in the ratio of two thousand parts of active material with one million parts of soil. One group of tomato plants are planted in the adjacent untreated soil as a control and an equal number planted in the treated and infested soil. Examination of the plants after the several weeks reveals the untreated tomato plants are heavily infected and severely damaged or killed by the disease while the treated plants are undamaged by the disease.

| Compound | Example of Preparation |
|---|---|
| (Cl, CCl₂, Cl ring with CH₂O–P(=O)(phenyl)–CH₂O bridge, Cl₂ position unknown) | XIV |
| (Cl, CCl₂, Cl ring with CH₂O–P–S–C₄H₉–CH₂O bridge) | VI |
| (Cl, CCl₂, Cl ring with CH₂O–P(=S)Cl–CH₂O bridge) (complete control at 50 p.p.m.) | XV |

We claim:
1. Hexahalo-5,5a,6,9,9a - hexahydro -6 ,9 - methano-2, 4,3-benzodioxaphosphepin of the formula:

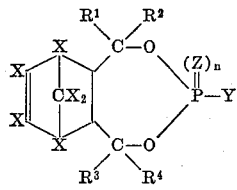

where n is from 0 to 1, X is bromine or chlorine, Z is an element selected from the group consisting of oxygen and sulfur and Y is a radical selected from the group consisting of hydrogen, chlorine, bromine, alkyl, chlorine substituted alkyl, bromine substituted alkyl, phenyl, nitro substituted phenyl, chlorine substituted phenyl and bromine substituted phenyl and alkyl substituted phenyl in which the alkyl group is of 1 to 4 carbon atoms, phenyl, alkoxy of one to eighteen carbon atoms, chlorine substituted alkoxy, bromine substituted alkoxy of one to eighteen carbon atoms, phenoxy, chlorine substituted phenoxy, bromine substituted phenoxy, nitro substituted phenoxy, alkyl substituted phenoxy in which the alkyl group is of 1 to 4 carbon atoms, sulfhydryl, alkyl mercapto, chlorine substituted phenylmercapto, bromine substituted phenylmercapto, nitro substituted phenylmercapto, alkyl substituted phenylmercapto in which the alkyl group is from 1 to 4 carbon atoms and hydroxy and, $R^1$, $R^2$, $R^3$ and $R^4$ are radicals selected from the group consisting of hydrogen, chlorine, bromine and lower alkyl.

2. 3,6,7,8,9,10,10-heptachloro-5,5a,6,9,9a-hexahydro-6, 9-methano-2,4,3-benzodioxaphosphepin-3-oxide.

3. 3-thiono-3,6,7,8,9,10,10-heptachloro-5,5a,6,9,9a-hexahydro-6,9-methano-2,4,3-benzodioxaphosphepin.

4. 3-thiono-3-thiolo-6,7,8,9,10,10-hexachloro - 5,5a,6,9, 9a-hexahydro-6,9-methano-2,4,3-benzodioxaphosphepin.

5. 3-methoxy-3-thiono-6,7,8,9,10,10-hexachloro- 5,5a,6, 9,9a-hexahydro-6,9-methano-2,4,3-benzodioxaphosphepin.

6. 3-stearyloxy-3-thiono-6,7,8,9,10,10-hexachloro- 5,5a, 6,9,9a-hexahydro-6,9-methano-2,4,3 - benzodioxaphosphepin.

7. 3-ethylmercapto-3-thiono-6,7,8,9,10,10-hexachloro-5, 5a,6,9,9a-hexahydro-6,9-methano-2,4,3 - benzodioxaphosphepin.

8. 3-(2-chloroethoxy)-3 - thiono - 6,7,8,9,10,10 - hexachloro-5,5a,6,69,9a-hexahydro-6,9-methano-2,4,3-benzodioxaphosphepin.

9. 3-propylmercapto-3 thiono-6,7,8,9,10,10-hexachloro-5,5a,6,9,9a-hexahydro-6,9 - methano - 2,4,3 - benzodioxaphosphepin.

10. 3-methyl-3 thiono-6,7,8,9,10,10-hexachloro-5,5a,6, 9,9a-hexahydro-6,9-methano-2,4,3-benzodioxaphosphepin.

11. 3-methoxymethylmercapto-3-thiono - 6,7,8,9,10,10-hexachloro-5,5a,6,9,9a-hexahydro-6,9-methano-2,4,3- benzodioxaphosphepin.

12. 3-hydroxy-6,7,8,9,10,10-hexachloro-5,5a,6,9,9a-hexahydro-6,9-methano-2,4,3-benzodioxaphosphepin.

13. 3-phenyl-3-thiono-6,7,8,9,10,10-hexachloro - 5,5a,6, 9,9a-hexahydro-6,9-methano-2,4,3-benzodioxaphosphepin.

14. 3-phenoxy-6,7,8,9,10,10 - hexachloro - 5,5a,6,9,9a-hexahydro-6,9-methano-2,4,3-benzodioxaphosphepin.

15. 3-phenoxy - 6,7,8,9,10,10 - hexachloro - 5,5a,6,9,9a-hexahydro-6,9-methano-2,4,3-benzodioxaphosphepin-3-oxide.

16. 1,5-dichloro-3-phenyl-6,7,8,9,10,10 - hexachloro - 5, 5a,6,9,9a-hexahydro-6,9-methano-2,4,3 - benzodioxaphosphepin-3-oxide.

17. 3-hydroxy-6,7,8,9,10,10-hexachloro-5,5a,6,9,9a-hexahydro-6,9-methano-2,4,3-benzodioxaphosphepin-3-oxide.

18. 1,5-dimethyl-3-thiono-3,6,7,8,9,10,10 - heptachloro-5,5a,6,9,9a-hexahydro-6,9-methano-2,4,3-benzodioxaphosphepin.

19. 3,3'-ethylenebis (3-thiono-6,7,8,9,10,10-hexachloro-5,5a,6,9,9a-hexahydro-6,9-methano-2,4,3-benzodioxaphosphepin).

20. 3-bromo-3-thiono-6,7,8,9,10,10-hexabromo - 5,5a,6, 9,9a-hexahydro-6,9-methano-2,4,3-benzodioxaphosphepin.

21. 3-mercapto-3-thiono-6,7,8,9-tetrachloro - 10,10 - dibromo-5,5a,6,9,9a-hexahydro-6,9-methano-2,4,3 - benzodioxaphosphepin.

22. 3,6,7,8,9,10,10-heptachloro-5,5a,6,9,9a - hexahydro-6,9-methano-2,4,3-benzodioxaphosphepin.

23. 3 - chloromethyl - 6,7,8,9,10,10 - hexachloro - 5,5a, 6,9,9a - hexahydro - 6,9 - methano - 2,4,3 - benzodioxaphosphepin-3-oxide.

24. 3 - (4 - nitrophenyl) - 3 - thiono - 6,7,8,9,10,10-hexachloro - 5,5a,6,9,9a - hexahydro - 6,9 - methano-2,4,3-benzodioxaphosphepin.

25. 3 - (p - t - butylphenoxy) - 3 - thiono - 6,7,8,9,10, 10 - hexachloro - 5,5a,6,9,9a - hexahydro - 6,9 - methano-2,4,3-benzodioxaphosphepin.

26. 3 - (2,4,5 - trichlorophenylmercapto) - 6,7,8,9,10, 10 - hexachloro - 5,5a,6,9,9a - hexahydro - 6,9 - methano-2,4,3-benzodioxaphosphepin.

27. 3 - phenylmercapto - 3 - thiono - 6,7,8,9,10,10-hexachloro - 5,5a,6,9,9a - hexahydro - 6,9 - methano-2,4,3-benzodioxaphosphepin.

28. 3 - butoxy - 6,7,8,9,10,10 - hexachloro - 5,5a,6,9,9a-hexahydro-6,9-methano-2,4,3-benzodioxaphosphepin.

29. 3 - ethylmercapto - 3 - thiono - 6,7,8,9,10,10 - hexachloro - 5,5a,6,9,9a - hexahydro - 6,9 - methano - 2,4,3-benzodioxaphosphepin.

30. A process for preparing hexahalo-5,5a,6,9,9a-hexahydro-6,9-methano-2,4,3-benzodioxaphosphepin of the formula:

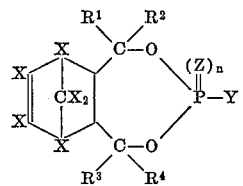

where n is a number from 0 to 1, X is bromine or chlorine, Z is an element selected from the group consisting of oxygen and sulfur, Y is a radical selected from the group consisting of hydrogen, bromine, chlorine, alkyl, chlorine substituted alkyl, bromine substituted alkyl, phenyl, chlorine substituted phenyl, bromine substituted phenyl, nitro substituted phenyl, alkyl substituted phenyl in which the alkyl group is from 1 to 4 carbon atoms, alkoxy of one to eighteen carbon atoms, chlorine substituted alkoxy, bromine substituted alkoxy of one to eighteen carbon atoms, phenoxy, chlorine substituted phenoxy, bromine substituted phenoxy, nitro substituted phenoxy, alkyl substituted phenoxy in which the alkyl group is from 1 to 4 carbon atoms, sulfhydryl, alkyl mercapto, substituted alkyl mercapto, aryl mercapto, chlorine substituted phenyl mercapto, bromine substituted phenyl mercapto, nitro substituted phenyl mercapto and alkyl substituted phenyl mercapto in which the alkyl group is of 1 to 4 carbon atoms and hydroxy, and $R^1$, $R^2$, $R^3$ and $R^4$ are radicals selected from the group consisting of hydrogen, bromine, chlorine and lower alkyl, comprising the steps of admixing a halogenated bicyclic diol of the formula below:

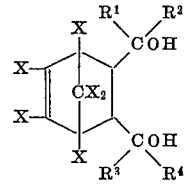

where X is bromine or chlorine, and $R^1$, $R^2$, $R^3$ and $R^4$ are radicals selected from the group consisting of hydrogen, chlorine, bromine and lower alkyl with a phosphorus compound selected from the group consisting of (a)

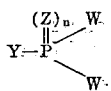

where Y, Z and n are as defined above and W is selected from the group consisting of chlorine, bromine, hydroxy, alkoxyl, and sulfhydryl; (b) oxides of phosphorus and (c) sulfides of phosphorus to react said halogenated bicyclic diol with said phosphorus compound to form said hexahydromethanobenzodioxaphosphepin.

31. A process according to claim 30 in which X is chlorine, $R^1$, $R^2$, $R^3$ and $R^4$ are hydrogen, and in which the phosphorus compound is an anhydride, thioanhydride, or halide of a phosphorus acid.

32. A process according to claim 31 in which the phosphorus compound is a compound selected from the group consisting of $P_2O_5$, $P_2S_5$, $PCl_3$, $PCl_5$, $P_2O_3$, $POCl_3$, $PSCl_3$, $PBr_3$, $POBr_3$, $CH_3POCl_2$, $CH_3PCl_2$, $C_6H_5POCl_2$, $C_6H_5PCl_2$, $CH_3OPCl_2$, $CH_3OPOCl_2$ and $CH_3OPSCl_2$ and the reactants are admixed in the presence of a base selected from the group consisting of tertiary amines, alkali metal carbonates and alkali metal hydroxides.

References Cited in the file of this patent

UNITED STATES PATENTS 2,881,196   Fields _____ Apr. 7, 1959
2,900,407   Lanham _____ Aug. 18, 1959

OTHER REFERENCES

Hooker: Chemicals Bulletin 100 D, June 6, 1960, p. 14.
Fields: "J. Am. Chem. Soc.," vol. 78, pp. 5821–5822 (1956).

UNITED STATES PATENT OFFICE
CERTIFICATE OF CORRECTION

Patent No. 3,146,253                               August 25, 1964

Sheldon B. Greenbaum et al.

It is hereby certified that error appears in the above numbered patent requiring correction and that the said Letters Patent should read as corrected below.

Column 9, line 15, for "benzodioxaphosphenpin" read -- benzodioxaphosphepin --; line 52, for "forty-four" read -- forty-two --; column 10, line 37, for "confimed" read -- confirmed --; column 13, line 48, for "-5,5a,6,69,9a-" read -- -5,5a,6,9,9a- --.

Signed and sealed this 20th day of April 1965.

SEAL)
Attest:

ERNEST W. SWIDER                              EDWARD J. BRENNER
Attesting Officer                               Commissioner of Patents